(12) United States Patent
Kunc et al.

(10) Patent No.: US 7,215,239 B2
(45) Date of Patent: May 8, 2007

(54) NON-CONTACT SMART CARD INTERROGATOR, WHEREIN ACROSS A TRANSMISSION LINE FROM AN ANTENNA TO A RECEIVER THE SIGNAL MODULATION VARIES BETWEEN AMPLITUDE MODULATION AND PHASE MODULATION

(76) Inventors: Vinko Kunc, Gerbičeva 50, Ljubljana (SI) 1000; Anton Štern, Srednja vas 34, Šenčur (SI) 4208

( * ) Notice: Subject to any disclaimer, the term of this patent is extended or adjusted under 35 U.S.C. 154(b) by 423 days.

(21) Appl. No.: 10/485,561

(22) PCT Filed: Jul. 25, 2002

(86) PCT No.: PCT/SI02/00021

§ 371 (c)(1),
(2), (4) Date: May 24, 2004

(87) PCT Pub. No.: WO03/015007

PCT Pub. Date: Feb. 20, 2003

(65) Prior Publication Data

US 2004/0201453 A1 Oct. 14, 2004

(30) Foreign Application Priority Data

Aug. 3, 2001 (SI) ................................ 200100207

(51) Int. Cl.
*H04Q 5/22* (2006.01)
*G08B 13/14* (2006.01)
*G06K 7/10* (2006.01)
(52) U.S. Cl. .................. 340/10.1; 340/10.2; 340/10.3; 340/10.4; 340/572.3; 340/572.5; 340/572.7; 235/462.26

(58) Field of Classification Search .............. 340/10.1, 340/10.2, 10.3, 10.4, 572.3, 572.5, 572.7, 340/825.54; 235/462.26
See application file for complete search history.

(56) References Cited

U.S. PATENT DOCUMENTS 5,703,573 A * 12/1997 Fujimoto et al. .......... 340/10.3
6,208,235 B1   3/2001 Trontelj

FOREIGN PATENT DOCUMENTS

| DE | 2008600 A | 9/1970 |
|---|---|---|
| DE | 19938998 A | 3/2001 |
| EP | 0466949 A | 1/1992 |
| JP | 11220424 | 8/1999 |
| WO | WO 113597 A1 | 2/2001 |

* cited by examiner

*Primary Examiner*—Jeffery Hofsass
*Assistant Examiner*—Scott Au
(74) *Attorney, Agent, or Firm*—Jacobson Holman PLLC

(57) ABSTRACT

In a non-contacting smart card interrogator (1) a first end (A) of an eighth-wave transmission line (13) is connected to a terminal connecting a first receiver (16) to a transmission line (14), and to a second end (B) of the transmission line (14) the carrier wave generator (11) is connected. To the first end (A) of the eighth-wave transmission line (13) the first amplitude demodulation receiver (16) and to the second end (B) thereof a second amplitude demodulation receiver (16') are connected. In the non-contacting smart card interrogator of the invention an effective use of amplitude demodulation is made possible by changing the phase modulation into an amplitude one by means of a passive element, whereby, however, no noise source has been introduced into the system.

5 Claims, 1 Drawing Sheet

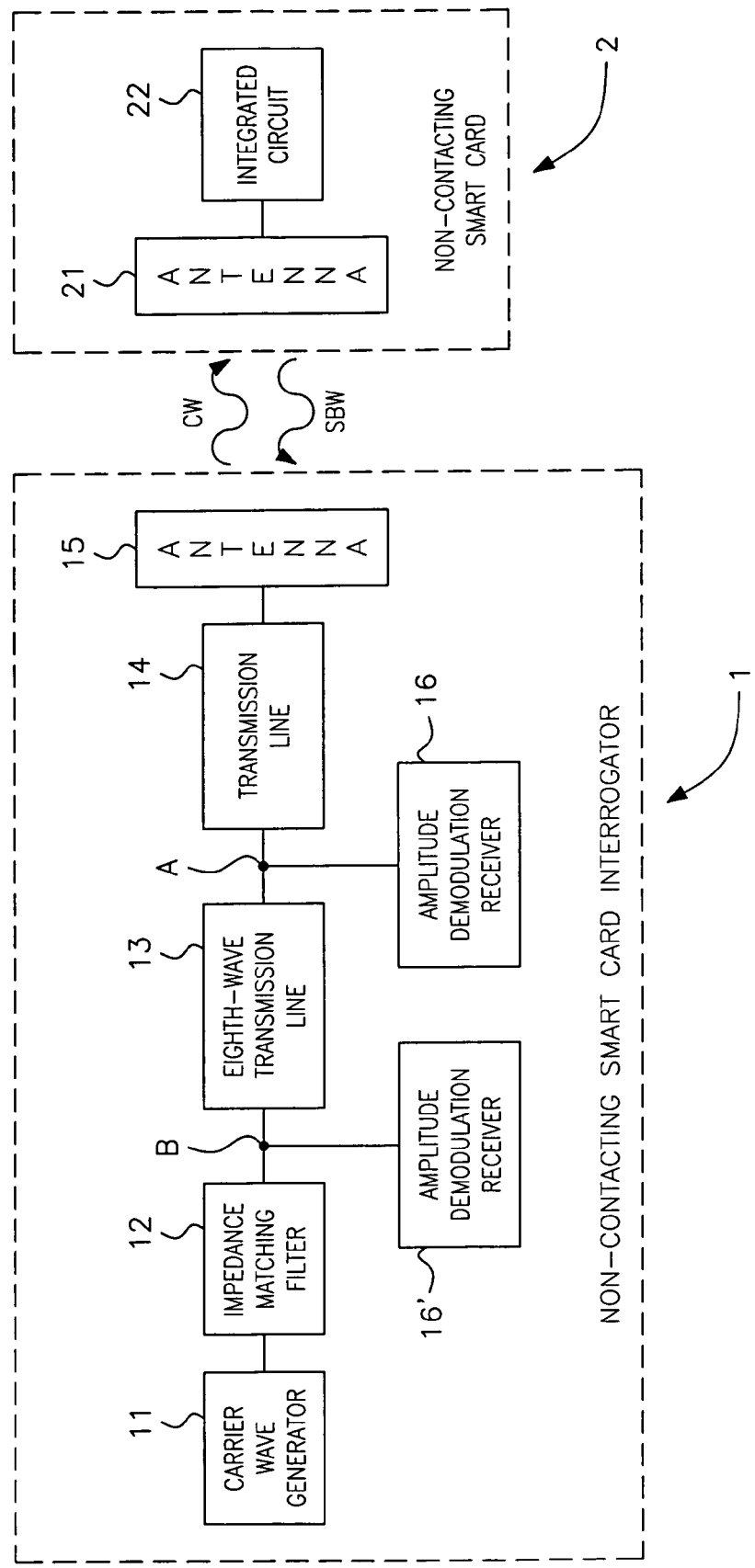

NON-CONTACT SMART CARD INTERROGATOR, WHEREIN ACROSS A TRANSMISSION LINE FROM AN ANTENNA TO A RECEIVER THE SIGNAL MODULATION VARIES BETWEEN AMPLITUDE MODULATION AND PHASE MODULATION

This is a nationalization of PCT/SI02/00021 filed Jul. 25, 2002 and published in English.

The invention concerns a non-contacting smart card interrogator, wherein across a transmission line from an antenna to a receiver the signal modulation varies between the amplitude and the phase one and which comprises a carrier wave generator and a first amplitude demodulation receiver, both being connected to the antenna through the transmission line. The interrogator is improved so that an effective amplitude demodulation of the signal generated within the smart card as an amplitude modulated signal is made possible.

Identification by means of radiofrequency data transmission quickly spreads to new areas of application. The subject matter of the invention is limited to an interrogator in a system carrying out a process of such identification, the system also comprising one or several smart cards. A non-contacting smart card interrogator comprises a carrier wave generator, e. g. at a frequency 13.56 MHz, and a receiver, usually an amplitude demodulation receiver, which are connected to an antenna through a transmission line. The interrogator antenna transmitts the carrier wave in the form of radiofrequency waves and receives radiofrequency waves, which, amplitude-modulated, are transmitted by an antenna of the smart card, when it receives the said carrier wave. Thereafter, received signals are identified by the interrogator.

In the interrogator antenna by means of a signal, which is amplitude-modulated in the smart card oscillating circuit and transmitted by the antenna of the smart card, a signal is generated, which at the antenna terminals is amplitude-modulated or phase-modulated or modulated according to the composition of the said two modulation kinds, depending on rations of the transmitted wave frequency with respect to resonance curves of the smart card antenna and the interrogator antenna as well as on the coupling factor between the two antennas. The modulation of the received signal also varies along the cable from connection terminals of the interrogator antenna to the receiver input.

In the patent U.S. Pat. No. 6,208,235 a circuit on a smart card is disclosed, wherein the variation from the amplitude modulation to phase modulation resulting from two or more smart cards present in the interrogator field is reduced.

In the system of the kind disclosed the demodulation of the phase part of the signal modulation is not acceptably solved.

A phase-modulated signal having a modulation angle below 90° is usually demodulated by a receiver having a phase-locked loop (PLL). It is locked onto the mean phase of the carrier wave and the output voltage of the phase detector depends on the current phase difference or phase modulation. However, the receiver circuit (a loop filter, voltage controlled oscillator—VCO) gets larger and especially the voltage controlled oscillator in the phase-locked loop becomes a dominant phase noise source, which sets limits to system properties.

A demodulation of the phase part of the signal modulation may be carried out by means of sampling in zero passages of the signal voltage. Collected samples represent a phase difference in any moment, and therefore a demodulated signal. However, a sampler, having an exact and stable timing down to the order of magnitude of 100 ps is needed. Also the phase noise of control pulses is mapped directly onto the demodulated signal.

Some producers have avoided difficulties arising at the demodulation of the phase part of the signal modulation by applying another modulation method in the smart card and providing an interrogator with an exceptionally sensitive receiver. For instance, a modulation having a subcarrier completely amplitude-modulated with data appropriately coded is never hidden by a phase. Since after the demodulation only the presence of the subcarrier is important and its phase after the demodulation is not relevant, the signal is acceptably received by means of an exceptionally sensitive amplitude demodulation receiver also when the signal power is predominantly phase-modulated. In this way, however, neither phase variation when no subcarrier is used nor at BPSK modulation is eliminated.

Consequently, the technical problem to be solved by the present invention is how to improve a circuit interrogating smart cards, when smart cards generating an amplitude-modulated signal are used, in order to have the interrogator reliably identify the smart card by means of its amplitude demodulation receiver.

The said technical problem is solved by a first embodiment of the non-contacting smart card interrogator according to the invention, wherein across a transmission line from an antenna to a receiver the signal modulation varies between the amplitude and the phase one and which comprises a carrier wave generator and a first amplitude demodulation receiver, both being connected to the antenna through a transmission line, which non-contacting smart card interrogator is characterized in that to a terminal connecting the first receiver to the transmission line, which may be made as a filter shifting a carrier wave for 45°, a first end of an eighth-wave transmission line is connected, and to a second end thereof the carrier wave generator is connected, and that to the first end of the eighth-wave transmission line the first amplitude demodulation receiver and to the second end of the eighth-wave transmission line a second amplitude demodulation receiver are connected.

The said technical problem is also solved by a second embodiment of the non-contacting smart card interrogator according to the invention, wherein across a transmission line from an antenna to a receiver the signal modulation varies between the amplitude and the phase ones and which comprises a carrier wave generator and a amplitude demodulation receiver, both being connected to the antenna through a transmission line, which non-contacting smart card interrogator is characterized in that to a terminal connecting the receiver to the transmission line, which may be made as a filter shifting a carrier wave for 45°, a first end of an eighth-wave transmission line is connected, and to a second end thereof the carrier wave generator is connected, and that the amplitude demodulation receiver is connected alternately to the first end and to the second end of the eighth-wave transmission line.

In both embodiments of the invention the non-contacting smart card interrogator is characterized in that the carrier wave generator is connected to the second end of the eighth-wave transmission line through an impedance matching filter attenuating the upper harmonics of the carrier wave as well.

In the non-contacting smart card interrogator of the invention an effective use of an amplitude demodulation is made possible by changing the phase modulation into an amplitude one by means of a passive element, whereby, however, no noise source has been introduced into the system.

The invention will now be explained in more detail by way of the description of two embodiments of the interrogator of the invention and with reference to the accompanying sole FIGURE representing a circuit scheme of the first embodiment.

BRIEF DESCRIPTION OF THE DRAWING

An interrogator 1 of a non-contacting smart card 2 comprises a carrier wave generator 11 and an amplitude demodulation receiver 16 (FIGURE). They are connected to an antenna 15 through a transmission line 14.

To a terminal connecting the receiver 16 to the transmission line 14, a first end A of an eighth-wave transmission line 13 is connected, and to its second end B the carrier wave generator 11 is connected, preferably through a matching LC filter 12 also attenuating the upper harmonics of the carrier wave.

The eighth-wave transmission line 13 may be made either by an coaxial cable or by a filter shifting the carrier wave phase for 45°. When the dielectric within the 50 Ω coaxial cable is polyethylene, at the frequency of 13.56 MHz the cable length is 1.825 m.

In the first embodiment of the interrogator 1 of the invention to the first end A of the eighth-wave transmission line 13 the first amplitude demodulation receiver 16 and to the second end B of the eighth-wave transmission line 13 a second amplitude demodulation receiver 16' are connected.

In the second embodiment of the interrogator 1 of the invention, however, the amplitude demodulation receiver 16 is connected alternately to the first end A and to the second end B of the eighth-wave transmission line 13 (not represented).

The carrier wave CW from the carrier wave generator 11 reaches an antenna 21 of the smart card 2 through the matching filter 12, the eighth-wave transmission line 13, transmission line 14 and an interrogator antenna 15. An integrated circuit 22 of the smart card absorbs the energy from the carrier wave CW and extracts a clock signal for its own operation and, through the antenna 21, transmits information on the smart card 2 in the form of an amplitude-modulated side band wave SBW towards the interrogator 1. In the interrogator antenna 15 the amplitude-modulated side band wave SBW generates a signal that on the antenna terminals is amplitude-modulated or phase-modulated or modulated according to the composition of the said modulation kinds.

The modulation of the signal received in the interrogator 1 then varies along the transmission line 14 and the eighth-wave transmission line 13 to the receiver input. With respect to the carrier wave phase, the phase in the side band of the modulated signal changes along the transmission lines 14, 13. Thus at a half wave length distance a site may be found where the spectral components are in-phase or of opposite phase (amplitude or inverse amplitude modulation), at a site with a 90° shift in one or another sense, however, there is a phase modulation with one or another polarization.

The distance between the receivers 16, 16' as determined by the eighth-wave transmission line 13 is such that always one of them gets the predominantly amplitude-modulated signal. When the receivers 16, 16' get equal portions of the amplitude and phase modulations, the received signal is for a factor $(2)^{-1/2}$ weaker than the strongest signal at the pure amplitude modulation on one of them.

The invention claimed is:

1. Non-contacting smart card interrogator (1), in which across a transmission line from an antenna (15) to a receiver the signal modulation varies between the amplitude and the phase and which comprises a carrier wave generator (11) and an amplitude demodulation receiver (16), both being connected to the antenna (15) through a transmission line 14, characterized in that to a terminal connecting the amplitude demodulation receiver (16) to the transmission line (14), a first end (A) of an eighth-wave transmission line (13) is connected, and to a second end (B) thereof the carrier wave generator (11) is connected, and that a signal at the first end (A) and a signal at the second end (B) of the eighth-wave transmission line (13) are sensed.

2. Non-contacting smart card interrogator (1) as recited in claim 1, characterized in that to the second end (B) of the eighth-wave transmission line (13) a second amplitude demodulation receiver (16') is connected.

3. Non-contacting smart card interrogator (1) as recited in claim 1, characterized in that the amplitude demodulation receiver (16) is connected alternately to the first end (A) and to the second end (B) of the eighth-wave transmission line (13).

4. Non-contacting smart card interrogator (1) as recited in claim 2, characterized in that the eighth-wave transmission line (13) is made as a filter shifting the carrier wave phase for 45°.

5. Non-contacting smart card interrogator (1) as recited in claim 2 characterized in that the carrier wave generator (11) is connected to the second end (B) of the eighth-wave transmission line (13) through an impedance matching filter (12) attenuating the upper harmonics of the carrier wave as well.

* * * * *